May 21, 1963 W. G. WADEY 3,090,626

BISTABLE STORAGE DISC

Filed Oct. 3. 1960

INVENTOR

WALTER G. WADEY

BY B. F. Griffin Jr.

ATTORNEY

United States Patent Office 3,090,626
Patented May 21, 1963

3,090,626
BISTABLE STORAGE DISC

Walter G. Wadey, Wynnewood, Pa., assignor to Sperry Rand Corporation, New York, N.Y., a corporation of Delaware Filed Oct. 3, 1960, Ser. No. 60,107
13 Claims. (Cl. 274—42)

This invention relates to information storage devices and more particularly to disc type storage devices having two stable states.

As is well known to those skilled in the art, magnetic recording discs provide a relatively economical means for storing information in a data processing system. One of the primary disadvantages of using recording discs is the amount of space required. In earlier systems which utilized discs, the discs were all mounted on a common shaft at fixed equidistant intervals with the intervals between adjacent discs being sufficient for the insertion of a read-record head. A single head was moved parallel to the mounting shaft and inserted between the discs for reading and recording. Therefore these systems required $N+1$ intra-disc spaces for the insertion of the read record heads, N being the number of recording discs.

In an effort to solve the problem of wasted space, a device was constructed which comprised a file of movable discs keyed to a splined shaft. A selector arm was arranged for parallel displacement of the discs along the shaft to permit insertion of the read record head. This device required only one intra-disc space but had certain disadvantages. Inherent in this system was the relatively large amount of force required for the parallel displacement of a plurality of discs along the shaft. Also, mechanical tolerances were critical and non-concentric rotation of the disc axis with respect to the shaft axis caused disc wobble with respect to a plane normal to the shaft axis.

Therefore, an object of this invention is to provide magnetic recording discs which may be closely stacked on a shaft yet require only one intra-disc space for the insertion of a read record head.

A further object of this invention is to provide recording discs which, when mounted on a shaft, require less force than heretofore for their displacement along the axis of the shaft.

The above mentioned objects are accomplished by providing a recording disc connected to a mounting hub in in such a manner that the combination has two stable mechanical states. In one state the mounting hub lies on one side of the plane of the recording disc and in the second state the mounting hub lies on the opposite side of the plane of the recording disc. Assuming that the combination is in one stable state, application of a force to the periphery of the recording disc will cause the arrangement to become dynamically unstable and the recording disc will move relative to its mounting hub and assume the second stable state.

A better understanding of the present invention may be had by reference to the following description and the accompanying drawings in which.

Figure 4A:
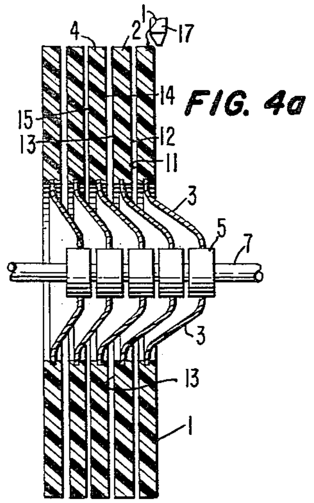
Figure 4B:
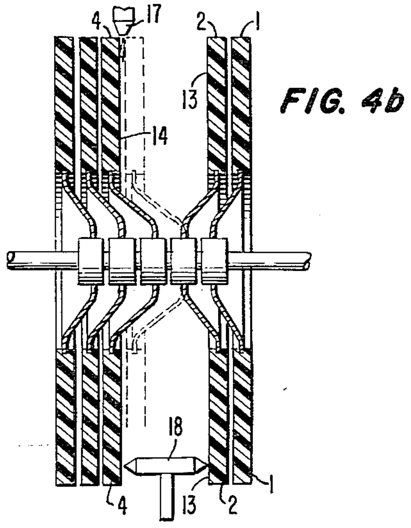

FIGURES 4*a* and 4*b* illustrate the operation of a stacked array of recording discs according to the present invention.

Figure 1:
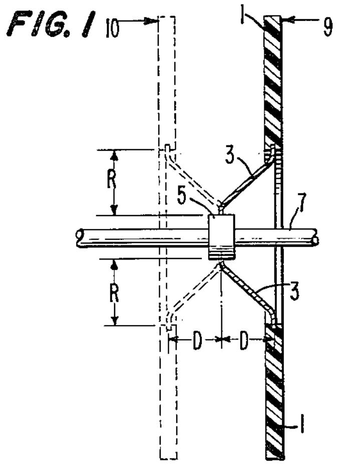
FIGURE 1 illustrates the operation of the present invention.

Referring to FIG. 1, the magnetic recording disc 1 is connected by a resilient means 3 to a mounting hub 5. The hub is fixed to a shaft 7 and rotates therewith. The disc may be similar in size and shape to a phonograph record with an enlarged center opening. The resilient means may be moulded into the recording disc and mounting hub or removably attached by conventional fastening means.

FIG. 1 shows a sectional view of the recording disc in one stable state with the mounting hub lying to the left of the plane of the disc. The dotted line portion of FIG. 1 shows the second stable state of the disc with the mounting hub lying to the right of the plane of the disc. When the device is at rest, the hub will not lie in the plane of the disc because the resilient means 3 has a length greater than the distance R which is the radial distance between the mounting hub and the inner edge of the disc. The axial displacement of the disc with respect to its mounting hub is the distance D. It is obvious that distance D is a function of the relationship between distance R and the effective length of the resilient means.

The operation of the bistable disc is as follows. Application of a single point force 9 to the rim of the disc tilts the disc out of its radial plane. This action creates forces in the resilient member 3 which becomes dynamically unstable and begins movement to the second stable state as indicated by the dashed lines. As the resilient means moves to its second stable state it carries the recording disc with it in a transient screw-like movement. Upon reaching this second stable state, the recording disc may be moved back to its first stable state by application of a point force as indicated by the arrow 10.

Figure 2:
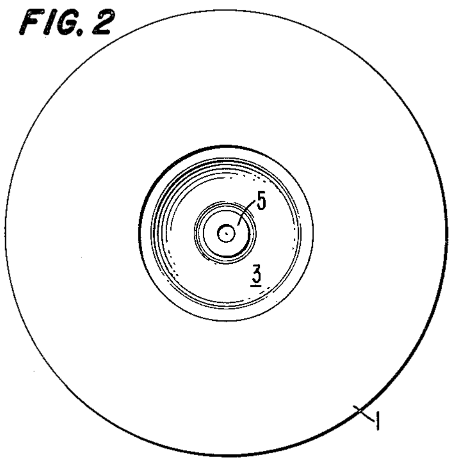
FIGURE 2 is a side view of the embodiment of FIG. 1.

FIG. 2 is a side view of FIG. 1 and shows the resilient means 3 as a belleville spring of the type well known in the art.

Figure 3:
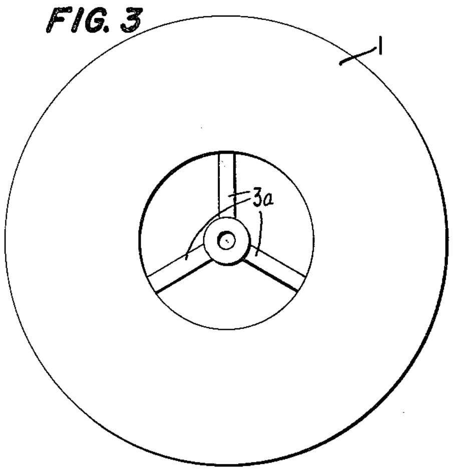
FIGURE 3 illustrates a second embodiment of the invention.

FIG. 3 shows a second embodiment wherein the resilient means comprises a plurality of springs 3*a* radially extending from the hub to the inner circumference of the disc in a radial spoke like manner. The springs may be either leaf or coil springs, made of spring steel, rubber, or other resilient material. It is important however that each of the springs 3*a* be greater in length than the radial distance R shown in FIG. 1 so that the springs are biased or have energy stored therein when they are in either stable state.

FIGS. 4*a* and 4*b* illustrate the operation and advantages of the present invention. FIG. 4*a* shows a plurality of recording discs each connected by a resilient means 3 to a hub 5 which is mounted in fixed relation to a common shaft 7. Note that the space between adjacent recording discs is insufficient to permit the insertion of a read record head.

Assume that is desired to record information on the surface 13 of the disc 2. Some means is provided for applying a force to the rim of the disc. As shown in FIG. 4 this means may be a jet nozzle 17 for applying fluid pressure to the surface 13 but it will be obvious to those skilled in the art that other means for applying mechanical pressure or force may be used. The nozzle 17 is movable parallel to the stack of recording discs and may start each selection cycle from a point to the right of disc 1 as shown in FIGURE 4*a*. The nozzle moves to the left, continually producing a fluid force which acts on successive discs as the nozzle moves. Upon reaching a point opposite the space between surfaces 11 and 12, the fluid force applied to surface 11 causes disc 1 to become dynamically unstable and flip to its opposite state as shown in FIGURE 4*b*. The nozzle continues to move to the left and stops upon reaching the point (FIG. 4*b*) opposite the space between recording surfaces 13 and 14. The fluid force applied by the nozzle against surface 13 causes disc 2 to become dynamically unstable and flip to its opposite stable state as shown in FIGURE 4*b*. The flipping of disc 2 creates a space between surfaces 13 and 14 sufficient for the insertion of the read/record head 18. The read/record head is then actuated to record information on surface 13. Controls for positioning the nozzle 17 and read/record head 18 may be any one of several suitable types well known in the art.

While the novel features of the invention as applied to preferred embodiments have been shown and described, it will be understood that various omissions and substitutions in the form and detail of the devices illustrated may be made by those skilled in the art without departing from the spirit of the invention.

I claim:

1. A bistable storage device comprising: a recording disc; mounting means; and normally stressed resilient means connected between said mounting means and said recording disc for normally holding said recording disc in an axially displaced position with respect to said mounting means.

2. A storage device comprising: record means having a hole in the center thereof; mounting means; and resilient means radially extending from said mounting means to the inner edge of said record means for supporting said record means, said resilient means being greater in length than the radial distance between said mounting means and the inner edge of said record means whereby said record means is normally supported in an axially displaced position with respect to the plane in which said resilient means extends from said mounting means.

3. In combination: a recording disc having a hole in the center thereof, a mounting means, and a plurality of resilient means radially extending from said mounting means to the inner edge of said recording disc, said resilient means being greater in length than the radial distance between said mounting means and the inner edge of said recording disc.

4. The combination as claimed in claim 3 wherein said plurality of resilient means comprises a plurality of leaf springs.

5. The combination as claimed in claim 3 wherein said plurality of resilient means comprises a plurality of springs.

6. A bistable recording device comprising: a record member having a hole in the center thereof; mounting means; resilient means connected between said mounting means and the inner edge of said record member, said resilient means being normally biased in a first stable condition to maintain said record member on one side of the plane of said mounting means; and means to apply a force to said record member, said force upsetting the bias of said resilient means whereby said resilient means moves said record member to a second stable position in which said record member lies on the opposite side of the plane of said mounting means.

7. A bistable recording device comprising: mounting means; resilient means connected to said mounting means; and a recording disc coaxially positioned with respect to said mounting means and normally axially displaced therefrom, said recording disc being connected to said resilient means.

8. A bistable recording device as claimed in claim 7 wherein the normal axial displacement of said recording disc with respect to said mounting means is a given distance on either side of the plane of said mounting means determined by the relationship between the effective length of said resilient means and the radial distance between said mounting means and the inner edge of said recording disc, the effective length of said resilient means being greater.

9. A bistable recording device as claimed in claim 8 wherein said resilient means is biased when said recording disc is normally axially displaced said given distance on either side from said mounting means, said normal axial displacements being the two stable states of said recording device.

10. A bistable recording device as claimed in claim 9 in combination with means to apply force to said recording device as it rests in one of said stable states, said force upsetting the bias of said resilient means whereby said resilient means and said recording device move to the other of said stable states.

11. The combination comprising: a recording disc having a hole therein; a dynamically unstable spring having two mechanically stable states mounted on said disc around the periphery of said hole; and mounting means for mounting said spring whereby said spring may assume either one of its two stable states.

12. The combination comprising: a recording disc having a hole therein; rotatable mounting means; and resilient means having two mechanically stable states, said resilient means being connected to said mounting means and to said recording disc at the edge of said record disc formed by said hole.

13. The combination comprising: a recording disc having a hole therein; a rotatable shaft; and means for flexibly mounting said disc for rotation with said shaft in either of two planes perpendicular to the axis of rotation of said shaft, said mounting means comprising resilient means mounted to said shaft and said recording disc at the inner edge formed by said hole, said resilient means having a length greater than the radial distance between said shaft and said inner edge.

References Cited in the file of this patent

UNITED STATES PATENTS

| | | |
|---|---|---|
| 2,617,655 | Leonard | Nov. 11, 1952 |
| 2,802,670 | Becton | Aug. 13, 1957 |